(12) United States Patent
Peng et al.

(10) Patent No.: US 11,669,990 B2
(45) Date of Patent: Jun. 6, 2023

(54) OBJECT AREA MEASUREMENT METHOD, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Yan Peng, Beijing (CN); Xiang Long, Beijing (CN); Shumin Han, Beijing (CN); Honghui Zheng, Beijing (CN); Zhuang Jia, Beijing (CN); Xiaodi Wang, Beijing (CN); Pengcheng Yuan, Beijing (CN); Yuan Feng, Beijing (CN); Bin Zhang, Beijing (CN); Ying Xin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 153 days.

(21) Appl. No.: 17/412,574

(22) Filed: Aug. 26, 2021

(65) Prior Publication Data

US 2021/0390728 A1 Dec. 16, 2021

(30) Foreign Application Priority Data

Jan. 21, 2021 (CN) .......................... 202110081896.0

(51) Int. Cl.
*G06T 7/62* (2017.01)
*G06F 18/241* (2023.01)
(Continued)

(52) U.S. Cl.
CPC ............ *G06T 7/62* (2017.01); *G06F 18/2137* (2023.01); *G06F 18/241* (2023.01);
(Continued)

(58) Field of Classification Search
None
See application file for complete search history.

(56) References Cited

U.S. PATENT DOCUMENTS

2018/0060719 A1* 3/2018 Kisilev .................. G06N 3/045
2019/0236411 A1* 8/2019 Zhu ....................... G06T 3/4046
(Continued)

FOREIGN PATENT DOCUMENTS

| CN | 108052911 A | 5/2018 |
| CN | 109255334 A | 1/2019 |

(Continued)

OTHER PUBLICATIONS

Basaeed et al., "A supervised hierarchical segmentation of remote-sensing images using a committee of multi-scale convolutional neural networks," International Journal of Remote Sensing, vol. 37, No. 7, pp. 1671-1691 (2016).

(Continued)

*Primary Examiner* — David Perlman
(74) *Attorney, Agent, or Firm* — Leydig, Voit & Mayer, Ltd.

(57) ABSTRACT

An object area measurement method and an apparatus are provided, relating to the computer vision and deep learning technology. The method includes acquiring an original image with a spatial resolution, the original image including a target object; acquiring an object identification model including at least two sets of classification models; generating one or more original image blocks based on the original image; performing operations on each original image block: scaling each original image block at at least two scaling levels to obtain scaled image blocks with at least two sizes, the scaled image blocks respectively corresponding to the at least two sets of classification models, and inputting the scaled image blocks into the object identification model to obtain an identification result of the target (Continued)

object; and determining an area of the target object based on the respective identification results of the one or more original image blocks and the spatial resolution.

20 Claims, 9 Drawing Sheets

(51) Int. Cl.
*G06F 18/25* (2023.01)
*G06F 18/2137* (2023.01)
*G06V 10/764* (2022.01)
*G06V 10/80* (2022.01)
*G06V 10/82* (2022.01)
*G06V 10/32* (2022.01)
*G06V 10/50* (2022.01)
*G06V 10/26* (2022.01)
*G06V 20/13* (2022.01)

(52) U.S. Cl.
CPC ............ *G06F 18/253* (2023.01); *G06V 10/26* (2022.01); *G06V 10/32* (2022.01); *G06V 10/50* (2022.01); *G06V 10/764* (2022.01); *G06V 10/809* (2022.01); *G06V 10/82* (2022.01); *G06V 20/13* (2022.01); *G06T 2207/20081* (2013.01); *G06T 2207/20084* (2013.01)

(56) References Cited

U.S. PATENT DOCUMENTS

2020/0005122 A1* 1/2020 Fan .................... G06V 30/2504
2020/0320273 A1  10/2020 Li

FOREIGN PATENT DOCUMENTS

| | | | |
|---|---|---|---|
| CN | 109815868 | A | 5/2019 |
| CN | 110119744 | A | 8/2019 |
| CN | 110598715 | A | 12/2019 |
| CN | 110781775 | A | 2/2020 |
| CN | 111091132 | A | 5/2020 |
| CN | 111274887 | A | 6/2020 |
| CN | 111860207 | A | 10/2020 |
| CN | 112101309 | A | 12/2020 |

OTHER PUBLICATIONS

Huang et al., "Combined multiscale segmentation convolutional neural network for rapid damage mapping from postearthquake very high-resolution images," Journal of Applied Remote Sensing, vol. 13(2) (Apr.-Jun. 2019).

Luotamo et al., "Multiscale Cloud Detection in Remote Sensing Images Using a Dual Convolutional Neural Network," IEEE Transactions on Geoscience and Remote Sensing, vol. 59, No. 6, pp. 4972-4983 (Jun. 2021).

Yao et al., "Geospatial Object Detection in Remote Sensing Images Based on Multi-Scale Convolutional Neural Networks," IEEE International Geoscience and Remote Sensing Symposium 2019 (IGARSS 2019), pp. 1450-1453 (2019).

Yao et al., "Multiscale Convolutional Neural Networks for Geospatial Object Detection in VHR Satellite Images," IEEE Geoscience and Remote Sensing Letters, vol. 18, No. 1, pp. 23-27 (Jan. 2021).

* cited by examiner

200

```
┌─────────────────────────────────────────────────────────────┐
│  Acquiring an original image with a spatial resolution,     │    210
│  the original image including a target object               │
└─────────────────────────────────────────────────────────────┘
                              ↓
┌─────────────────────────────────────────────────────────────┐
│  Acquiring an object identification model, the object       │
│  identification model including at least two sets of        │    220
│  classification models, and each of at least two sets of    │
│  classification models including at least two types of      │
│  semantic segmentation network models                       │
└─────────────────────────────────────────────────────────────┘
                              ↓
┌─────────────────────────────────────────────────────────────┐
│  Generating one or more original image blocks based on      │    230
│  the original image                                         │
└─────────────────────────────────────────────────────────────┘
                              ↓
┌─────────────────────────────────────────────────────────────┐
│  Scaling each original image block at at least two scaling  │
│  levels to obtain scaled image blocks with at least two     │
│  sizes, wherein the scaled image blocks with the at least   │    240
│  two sizes respectively correspond to the at least two      │
│  sets of classification models; and inputting the scaled    │
│  image blocks with the at least two sizes into the object   │
│  identification model to obtain an identification result    │
│  of the target object in the original image block           │
└─────────────────────────────────────────────────────────────┘
                              ↓
┌─────────────────────────────────────────────────────────────┐
│  Determining an area of the target object based on          │    250
│  respective identification results of the one or more       │
│  original image blocks and the spatial resolution of        │
│  the original image                                         │
└─────────────────────────────────────────────────────────────┘
```

```
┌─────────────────────────────────────────────────────────┐
│ Inputting the scaled image blocks with the at least two sizes into │
│ corresponding sets of classification models in the at least two sets │  410
│              of classification models                    │
└─────────────────────────────────────────────────────────┘
                              ↓
┌─────────────────────────────────────────────────────────┐
│ Extracting prediction maps generated by the at least two types of │
│     semantic segmentation network models of each set of  │
│      classification model for a scaled image block with a │
│   corresponding size in the scaled image blocks with the at least │  420
│    two sizes, wherein pixel points of each prediction map │
│  respectively indicate predication categories of pixel points of the │
│          scaled image block with the corresponding size  │
└─────────────────────────────────────────────────────────┘
                              ↓
┌─────────────────────────────────────────────────────────┐
│ Fusing the prediction maps respectively generated by the semantic │  430
│    segmentation network models of the at least two sets of │
│   classification models to obtain the identification result of the │
│           target object in the original image block      │
└─────────────────────────────────────────────────────────┘
```

```
┌─────────────────────────────────────────────────────────┐
│  Scaling the predication maps respectively generated by the semantic segmentation │
│  network models of the at least two sets of classification models to each have the preset │  510
│ size so that pixel points of each scaled predication map are in one-to-one correspondence │
│               with pixel points of the original image block │
└─────────────────────────────────────────────────────────┘
                              ↓
┌─────────────────────────────────────────────────────────┐
│    For each pixel point of the original image block: counting respective prediction │  520
│  categories of the scaled predication maps at a position of the pixel point; and selecting a │
│     predication category with a highest counting number from a counting result of the │
│              predication categories as a final category of the pixel point │
└─────────────────────────────────────────────────────────┘
                              ↓
┌─────────────────────────────────────────────────────────┐
│ Determining all pixel points, whose final categories are a target object category, in the │  530
│  original image block as identification regions of the target object in the original image │
│                              block                       │
└─────────────────────────────────────────────────────────┘
```

FIG. 5

OBJECT AREA MEASUREMENT METHOD, ELECTRONIC DEVICE AND STORAGE MEDIUM

CROSS-REFERENCE TO RELATED APPLICATIONS

This application claims the benefit of Chinese Patent Application No. 202110081896.0, titled "OBJECT AREA MEASUREMENT METHOD, APPARATUS, ELECTRONIC DEVICE AND STORAGE MEDIUM" filed on Jan. 21, 2021, the contents of which are hereby incorporated by reference in their entireties for all purposes.

TECHNICAL FIELD

Embodiments of the present disclosure relates to the technical field of artificial intelligence, and particularly relates to a computer vision and deep learning technology, in particular to an object area measurement method, apparatus, electronic device computer readable storage medium and computer program product.

BACKGROUND OF THE INVENTION

The artificial intelligence is a subject that researches simulation on some thinking processes and intelligent behaviors (e.g., learning, reasoning, thinking, planning and the like) of people by a computer, and includes not only hardware-level technologies, but also software-level technologies. The hardware technologies of the artificial intelligence generally include technologies such as sensors, special artificial intelligence chips, cloud computing, distributed storage and big data processing; and the software technologies of the artificial intelligence mainly include several directions of a computer vision technology, a voice identification technology, a natural language processing technology, machine learning/deep learning, a big data processing technology, a knowledge graph technology and the like.

Object area measurement, e.g., measurement of a ground object area, has a very high practical value in the fields of crop planting, urban and rural planning, flood prevention and disaster rescue and the like. In the related arts, there is still a lot of room for improvement for the technical solutions of measurement of the ground object area.

Methods described in this part are not necessarily previously assumed or adopted methods. Unless otherwise specified, it should not be assumed that any of the methods described in this part is regarded as the prior art just because the methods are included in this part. Similarly, unless otherwise specified, the problems mentioned in this part should not be considered to have been recognized in any prior art.

BRIEF SUMMARY OF THE INVENTION

Embodiments of the present disclosure provides an object area measurement method and device, electronic equipment, a computer readable storage medium and a computer program product.

According to one aspect of the present disclosure, an object area measurement method is provided, comprising: acquiring an original image with a spatial resolution, the original image comprising a target object; acquiring an object identification model, the object identification model comprising at least two sets of classification models, and each of the at least two sets of classification models comprising at least two types of semantic segmentation network models; generating one or more original image blocks based on the original image; performing operations on each original image block, the operations comprising: scaling each original image block at at least two scaling levels to obtain scaled image blocks with at least two sizes, wherein the scaled image blocks with the at least two sizes respectively correspond to the at least two sets of classification models; and inputting the scaled image blocks with the at least two sizes into the object identification model to obtain an identification result of the target object in the original image block; and determining an area of the target object based on respective identification results of the one or more original image blocks and the spatial resolution of the original image.

According to another aspect of the embodiments of the present disclosure, a computing device is provided, comprising: a memory, a processor and a computer program stored on the memory, wherein the processor is configured to execute the computer program to implement operations comprising: acquiring an original image with a spatial resolution, the original image comprising a target object; acquiring an object identification model, the object identification model comprising at least two sets of classification models, and each of the at least two sets of classification models comprising at least two types of semantic segmentation network models; generating one or more original image blocks based on the original image; performing operations on each original image block, the operations comprising: scaling each original image block at at least two scaling levels to obtain scaled image blocks with at least two sizes, wherein the scaled image blocks with the at least two sizes respectively correspond to the at least two sets of classification models; and inputting the scaled image blocks with the at least two sizes into the object identification model to obtain an identification result of the target object in the original image block; and determining an area of the target object based on respective identification results of the one or more original image blocks and the spatial resolution of the original image.

According to still another aspect of the embodiments of the present disclosure, a non-transitory computer readable storage medium is provided, having a computer program stored thereon, wherein when the computer program, when executed by a processor, implements operations comprising: acquiring an original image with a spatial resolution, the original image comprising a target object; acquiring an object identification model, the object identification model comprising at least two sets of classification models, and each of the at least two sets of classification models comprising at least two types of semantic segmentation network models; generating one or more original image blocks based on the original image; performing operations on each original image block, the operations comprising: scaling each original image block at at least two scaling levels to obtain scaled image blocks with at least two sizes, wherein the scaled image blocks with the at least two sizes respectively correspond to the at least two sets of classification models; and inputting the scaled image blocks with the at least two sizes into the object identification model to obtain an identification result of the target object in the original image block; and determining an area of the target object based on respective identification results of the one or more original image blocks and the spatial resolution of the original image.

It should be understood that the contents described in this part are not intended to identify the key or important characteristics of the embodiments of the present disclosure, and also not used for limiting the scope of the present disclosure. Other characteristics of the present disclosure become easy to understand by the specification below.

BRIEF DESCRIPTION OF THE DRAWING(S)

The accompanying drawings show the embodiments and constitute a part of the specification, and are used to explain the example implementation manners of the embodiments together with the text description of the specification. The shown embodiments are only for the purpose of illustration and do not limit the scope of the claims. In all the accompanying drawings, the same reference numerals refer to similar but not necessarily identical elements.

FIG. 2 shows a flow chart of an object area measurement method according to an embodiment of the present disclosure;

FIG. 4 shows a flow chart of an example operation of obtaining an identification result of a target object obtained in the method in FIG. 2 according to an embodiment of the present disclosure;

FIG. 5 shows a flow chart of an example operation of fusing predication maps in the method in FIG. 4 according to an embodiment of the present disclosure;

DETAILED DESCRIPTION OF THE INVENTION

The example embodiments of the present disclosure will be illustrated below in combination with the accompanying drawings, wherein various details of the embodiments of the present disclosure are included for facilitating understanding, and the example embodiments should be considered to be merely example. Therefore, those of ordinary skill in the art should realize that various changes and modifications can be made to the embodiments described herein without departure from the scope of the present disclosure. Similarly, for clarity and conciseness, description on publicly known functions and structures is omitted in the following description In the embodiments of the present disclosure, unless otherwise specified, the terms "first", "second" and the like are used to describe various elements and are not intended to limit the position relationship, the timing relationship or the importance relationship of the elements. Such terms are only for distinguishing one element from another element. In some examples, a first element and a second element may refer to the same example of the element, while in some cases, based on the description of the context, the first element and the second element may also refer to different examples.

The terms used in the description of the various examples in the present disclosure are only for the purpose of describing specific examples and are not intended to perform limitation. Unless the context clearly indicates otherwise, if the number of the elements is not specifically defined, there may be one or a plurality of elements. In addition, the term "and/or" used in the present disclosure covers any one and all possible combinations of the listed items.

In the related arts, measurement on a ground object area is conducted mainly by manual field measurement or estimation after processing a remote sensing image using a conventional image algorithm, which results in a significant consumption of manpower and a low accuracy.

The embodiments of the present disclosure provides technical solutions of predicting an area of a target object based on deep learning image segmentation and multi-scale multi-model fusion.

The embodiments of the present disclosure will be described below in detail in combination with the accompanying drawings.

Figure 1:
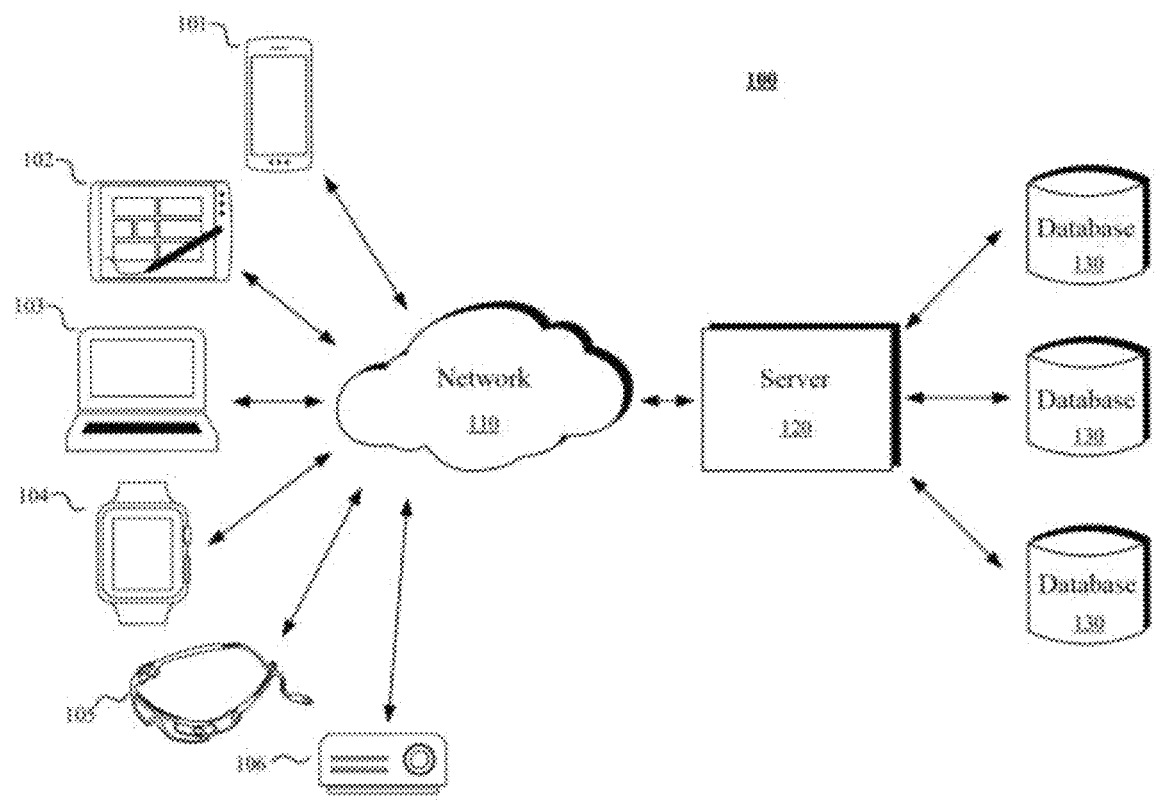
FIG. 1 shows a schematic diagram of an example system in which various methods described herein may be implemented according to an embodiment of the present disclosure.

FIG. 1 shows a schematic diagram of an example system 100 in which various methods and devices described herein are implemented according to an embodiment of the present disclosure. Referring to FIG. 1, a system 100 includes one or more pieces of client equipment 101, 102, 103, 104, 105 and 106, a server 120 and one or more communication networks 110 for coupling one or more pieces of client equipment to the server 120. The client equipment 101, 102, 103, 104, 105 and 106 can be configured to execute one or more applications.

In the embodiment of the present disclosure, the server 120 can operate one or more services or software applications capable of executing an object area measurement method.

In some embodiments, the server 120 also can provide other services or software applications capable of including a non-virtual environment and a virtual environment. In some embodiments, these services can be provided as web-based services or cloud services, for example, are provided to users of the client equipment 101, 102, 103, 104, 105 and/or 106 under a Software-as-a-Service (SaaS) model.

In the configuration shown in FIG. 1, the server 120 can include one or more components for achieving functions executed by the server 120. These components can include a software component, a hardware component or a combination thereof, capable of being executed by one or more processors. The users operating the client equipment 101, 102, 103, 104, 105 and/or 106 can sequentially utilize one or more client applications to interact with the server 120 so as to utilize the services provided by these components. It should be understood that various different system configurations are possible, and can be different from the configuration of the system 100. Therefore, FIG. 1 is an example of a system for implementing various methods described herein, and is not intended to perform limitation.

The users can use the client equipment 101, 102, 103, 104, 105 and/or 106 to measure an area of a target object. The client equipment can provide interfaces for enabling the users of the client equipment to interact with the client equipment. The client equipment also can output information to the users via the interfaces. FIG. 1 only describes six types of client equipment, but those skilled in the art can understand that the present disclosure can support any number of client equipment.

The client equipment 101, 102, 103, 104, 105 and/or 106 can include various types of computer equipment, e.g., portable handheld equipment, a general-purpose computer (such as a personal computer and a laptop computer), a workstation computer, a wearable device, a game system, a thin client, various message transceiver equipment, a sensor or other sensing equipment, etc. The computer equipment can operate various types and versions of software applications and operating systems, e.g., Microsoft Windows, Apple iOS, a UNIX-like operating system, and a Linux or Linux-like operating system (e.g., Google Chrome OS); or includes various mobile operating systems, e.g., Microsoft Windows Mobile OS, iOS, Windows Phone and Android. The portable handheld equipment can include a cell phone, a smart phone, a tablet computer, a Personal Digital Assistant (PDA) and the like. The wearable device can include a head-mounted display and other equipment. The game system can include various handheld game equipment, game equipment supporting the Internet and the like. The client equipment can execute various different applications, e.g., various applications related to the Internet, a communication application (e.g., an electronic mail application) and a Short Messaging Service (SMS) application, and can use various communication protocols.

The network 110 can be any type of network known very well by those skilled in the art, which can use any one of various available protocols (including, but not limited to, TCP/IP, SNA, IPX and the like) to support data communication. Only as an example, one or more networks 110 can be a Local Area Network (LAN), an Ethernet-based network, a token ring, a Wide Area Network (WAN), the Internet, a virtual network, a Virtual Private Network (VPN), the Intranet, the Extranet, a Public Switched Telephone Network (PSTN), an infrared network, a wireless network (e.g., Bluetooth and WIFI) and/or a random combination thereof and/or other networks.

The server 120 can include one or more general-purpose computers, a dedicated server computer (e.g., a Personal Computer (PC) server, a UNIX server and a middle-end server), a blade server, a large-scale computer, a server cluster or any other proper arrangements and/or combinations. The server 120 can include one or more virtual machines operating a virtual operating system, or other computing architectures (e.g., one or more flexible pools of logic storage equipment which can be virtualized to maintain virtual storage equipment of the server) involving virtualization. In various embodiments, the server 120 can operate one or more services or software applications providing functions described below.

A computing unit in the server 120 can operate one or more operating systems including any of the above-mentioned operating systems and any commercially available server operating systems. The server 120 also can operate any one of various additional server applications and/or mid-tier applications, including an HTTP server, an FTP server, a CGI server, a JAVA server, a database server and the like.

In some implementation manners, the server 120 can include one or more applications so as to analyze and merge data feeds and/or event updates received from the users of the client equipment 101, 102, 103, 104, 105 and 106. The server 120 also can include one or more applications so as to display the data feeds and/or real-time events via one or more pieces of display equipment of the client equipment 101, 102, 103, 104, 105 and 106.

In some implementation manners, the server 120 can be a server of a distributed system, or a server combining a blockchain. The server 120 also can be a cloud server, or an intelligent cloud computing server or an intelligent cloud host with the artificial intelligence technology. The cloud server is a hosting product in a cloud computing service system so as to overcome the defects of high management difficulty and weak business expansibility in services of a conventional physical host and a Virtual Private Server (VPS).

The system 100 further can include one or more databases 130. In some embodiments, these databases can be used for storing data and other information. For example, one or more of the databases 130 can be used for storing information such as audio files and video files. The database 130 can reside at various positions. For example, the database used by the server 120 can be local in the server 120, or can be away from the server 120 and can communicate with the server 120 via a network-based or dedicated connection. The database 130 may be in different types. In some embodiments, the database used by the server 120 can be a database, e.g., a relational database. One or more of these databases and data from the databases data can be stored, updated and retrieved in response to a command.

In some embodiments, one or more of the databases 130 also can be used by applications to store data of the applications. The databases used by the applications can be different types of databases, e.g., a key value storage library, an object storage library or a conventional storage library supported by a file system.

The system 100 in FIG. 1 can be configured and operated in various manners, so that various methods and devices described according to the present disclosure can be applied.

FIG. 2 shows a flow chart of an object area measurement method 200 according to an embodiment of the present disclosure. As shown in FIG. 2, the method 200 includes steps 210 to 250.

In step 210, an original image with a spatial resolution is acquired. The original image includes a target object.

In step 220, an object identification model is acquired. The object identification model includes at least two sets of classification models, and each of the at least two sets of classification models includes at least two types of semantic segmentation network models.

In step 230, one or more original image blocks are generated based on the original image.

In step 240, operations are performed on each original image block. The operations includes: scaling each original image block at at least two scaling levels to obtain scaled image blocks with at least two sizes, wherein the scaled image blocks with the at least two sizes respectively correspond to the at least two sets of classification models; and inputting the scaled image blocks with the at least two sizes into the object identification model to obtain an identification result of the target object in the original image block.

In step 250, an area of the target object is determined based on respective identification results of the one or more original image blocks and the spatial resolution of the original image.

According to some example embodiments, the original image including the target object can be a remote sensing image, and the target object can be, for example, a water area, a cultivated land or a street and the like.

According to some example embodiments, the spatial resolution of the original image can represent a scale or size of a minimum unit, which can be distinguished in detail, in the image.

According to some example embodiments, generating the one or more original image blocks may include cutting the original image into the one or more original image blocks, with each original image block having a preset size.

According to some example embodiments, a cutting size for the original image can be regulated according to the computing performance of the equipment applying method 200. In some embodiments, for high computing performance, the original image can be treated as a single original image block. In other embodiments, for low computing performance, the original image can be cut into a plurality of original image blocks so as to save processing time for object prediction.

Figure 3:
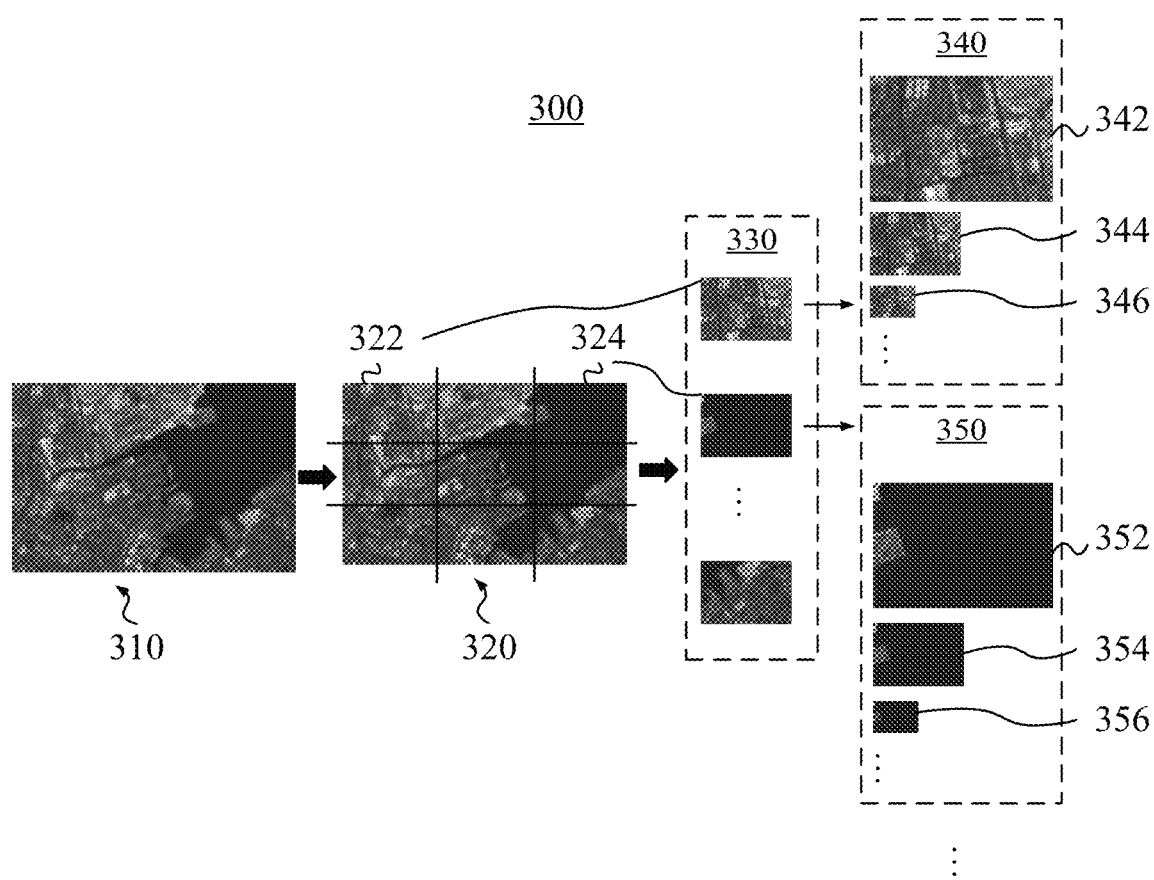
FIG. 3 shows a schematic diagram of an example operation of an image cutting and scaling process according to an embodiment of the present disclosure.

FIG. 3 shows a schematic diagram of an example operation of an image cutting and scaling process 300 according to an embodiment of the present disclosure. As shown in FIG. 3, an original image 310 can be cut along transverse and longitudinal lines in a labeled version 320 of the original image. The original image 320 includes part of original images 322 and 324. After the original image is cut, one or more original image blocks 330 can be generated. The one or more original image blocks 330 include original image blocks 322 and 324. It should be understood that the cutting manner for the original image 310 in the figure is merely an example. An alternative cutting manner can be selected according to operation time or other considerations.

Next, the one or more original image blocks 330 are subjected to at least two scaling levels of scaling to obtain the scaled image blocks with at least two sizes. In some embodiments, the original image block 322 can be scaled to generate a scaled image block 340. The scaled image block 340 can include a scaled image block 342 with a first size, a scaled image block 344 with a second size, a scaled image block 346 with a third size and the like. Similarly, the original image block 324 can be scaled to generate a scaled image block 350. The scaled image block 350 can include a scaled image block 352 with a first size, a scaled image block 354 with a second size, a scaled image block 356 with a third size and the like.

In some example embodiments, the object identification model can include at least two sets of classification models. The scaled image blocks 340, 350 and the like with at least two sizes respectively correspond to the at least two sets of classification models, i.e., the number of the scaling levels for scaling corresponds to the number of the sets of the classification models in the object identification model.

In some example embodiments, the object identification model can be obtained by training. Firstly, an original remote sensing image sample can be acquired, and a ground object in the original remote sensing image sample is subjected to binary classification labeling pixel by pixel. For example, when an area of a water body is concerned, each pixel can be labeled as being in a water body type or a non-water-body type.

Then, the labeled original remote sensing image sample can be cut. Then the cut original sensing image sample is subjected to at least two scaling levels of scaling to obtain original remote sensing image samples with at least two sizes. In some embodiments, the original remote sensing image is cut into 512×512 sample blocks which are then subjected to three scaling levels of scaling, e.g., 256×256, 512×512 and 1024×1024.

Next, each type of original remote sensing image samples with at least two sizes are proportionally divided into a training sample set and a verification sample set with the corresponding size according to a proportion. In some embodiments, the samples can be divided into a training sample set and a verification sample set according to a proportion of 9:1.

Next, various different deep learning semantic segmentation network models can be trained based on the image samples with different sizes so as to obtain models corresponding to the samples with various sizes.

Next, the trained models can be used for carrying out the prediction on the images with corresponding sizes in the verification set, so that a plurality of prediction results corresponding to various sizes and various semantic segmentation network models can be obtained. The plurality of prediction results are scaled to the same size, and each pixel point is classified using a voting mechanism.

Finally, the classification results can be compared against the labeling results in the original samples. For example, mean Intersection over Union (mIoU) values of the prediction results and the labeling results can be obtained. The models are trained repeatedly until the mIoU values reach a preset threshold, so as to obtain the object identification model.

According to some example embodiments, each of at least two types of semantic segmentation network models can be a human posture estimation model HR-NET, a DeepLabV3+ model or a U-Net model.

In summary, according to the embodiments of the present disclosure in which the deep learning image segmentation is adopted, the remote sensing image with a known resolution is scaled, then various sizes of remote sensing images are predicted by using different types of segmentation network models, different sizes of results predicted by various models are scaled to the same size, and then the results of the models in the various sizes are fused. Finally, the area is computed according to the pixel number of the classification results and the resolution. The accuracy of object segmentation and prediction precision are improved as a result of the use of multi-scale multi-model prediction.

FIG. 4 shows a flow chart of an example operation of obtaining a target object identification result in the method of FIG. 2 according to an embodiment of the present disclosure. As shown in FIG. 4, in the method of FIG. 2, inputting the scaled image blocks with at least two sizes into the object identification model to obtain the identification result of the target object in the original image block (step 240) can include steps 410 to 430.

In step 410, the scaled image blocks with the at least two sizes are input into corresponding sets of classification models in the at least two sets of classification models.

In step 420, prediction maps are extracted that are generated by the at least two types of semantic segmentation network models of each set of classification model for a scaled image block with a corresponding size in the scaled image blocks with the at least two sizes, wherein pixel points of each prediction map respectively indicate predication categories of pixel points of the scaled image block with the corresponding size.

In step 430, the prediction maps are fused that are respectively generated by the semantic segmentation network models of the at least two sets of classification models to obtain the identification result of the target object in the original image block.

In some example embodiments, after the scaled original image blocks are generated, the original image blocks in different sizes can be input into the classification models for corresponding sizes. In some embodiments, the original image blocks can be scaled to three sizes, i.e., 256×256, 512×512 and 1024×1024. Corresponding to the sizes, the object identification model can include three sets of classification models: a classification model 256, a classification model 512 and a classification model 1024. In some embodiments, an original image block in the size of 256×256 is input into the classification model 256, an original image block in the size of 512×512 is input into the classification model 512, and an original image block in the size of 1024×1024 is input into the classification model 1024.

Next, at least two types of semantic segmentation network models in the classification model can extract prediction maps of the scaled image blocks. In some embodiments, at least two types of semantic segmentation network models in the classification model 256 can extract prediction maps of the scaled image block with the size of 256×256. Similarly, at least two types of semantic segmentation network models in the classification model 512 can extract prediction maps of the scaled image block with the size of 512×512, and at least two types of semantic segmentation network models in the classification model 1024 can extract prediction maps of the scaled image block with the size of 1024×1024. Various pixel points of each prediction map can respectively indicate prediction categories of various pixel points of the scaled image block with the corresponding size.

Further, for each pixel point in the original image block, a plurality of prediction categories corresponding to the pixel point in each size (a plurality of prediction categories in the size of 256×256, a plurality of prediction categories in the size of 512×512 and a plurality of prediction categories in the size of 1024×1024) can be obtained. In addition, for example, the plurality of prediction categories in the size of 256×256 can include a plurality of prediction categories corresponding to the number of types of the semantic segmentation network models. In some embodiments, each set of segmentation network models can include three types of semantic segmentation network models, e.g., HR-Net, DeepLabV3+ and U-Net. Further, a plurality of prediction categories of each pixel point in the size of 256×256 can include HR-Net (256), DeepLabV3+ (256) and U-Net (256). Similarly, a plurality of prediction categories of the same pixel point in the size of 512×512 can include HR-Net (512), DeepLabV3+ (512) and U-Net (512), and a plurality of prediction categories of the same pixel point in the size of 1024×1024 can include HR-Net (1024), DeepLabV3+ (1024) and U-Net (1024). Therefore, for each pixel point, the object identification model can generate a plurality of prediction categories. In some embodiments, each pixel point can have nine prediction categories in total: HR-Net (256), DeepLabV3+ (256), U-Net (256), HR-Net (512), DeepLabV3+ (512), U-Net (512), HR-Net (1024), DeepLabV3+ (1024) and U-Net (1024).

Finally, the respective prediction categories of the semantic segmentation network models of the at least two sets of classification models can be fused to obtain the identification result of the target object in the original image block.

In conclusion, according to the embodiment of the present disclosure in which different types of segmentation network models are adopted to carry out prediction on various sizes of remote sensing images, the multi-size property ensures the diversity of image features, and the multi-model property solves the problem of unstable prediction results of one single model in certain cases. Moreover, the accuracy of object segmentation prediction is improved by fusing the prediction results of the various models.

FIG. 5 shows a flow chart of an example operation of fusing the prediction maps in the method of FIG. 4 according to an embodiment of the present disclosure. As shown in FIG. 5, fusing the prediction maps respectively generated by the semantic segmentation network models of the at least two sets of classification models to obtain the identification result of the target object in the original image block (step 430) in the method of FIG. 4, can include steps 510 to 530.

In step 510, the prediction maps respectively generated by the semantic segmentation network models of the at least two sets of classification models are scaled to each have the preset size so that pixel points of each scaled prediction map are in one-to-one correspondence with pixel points of the original image block.

In step 520, for each pixel point of the original image block, respective prediction categories of the scaled prediction maps at a position of the pixel point are counted, and a prediction category with a highest counting number is selected from a counting result of the prediction categories as a final category of the pixel point.

In step 530, all pixel points, whose final categories are a target object category, in the original image block are determined as identification regions of the target object in the original image block.

In some example embodiments, an original image can be cut into original image blocks with a preset size of 512×512. Since prediction maps for the original image blocks have multiple sizes in the case of multi-size scaling, the prediction map in each size can be scaled into a prediction map with the preset size of 512×512.

Figure 6:
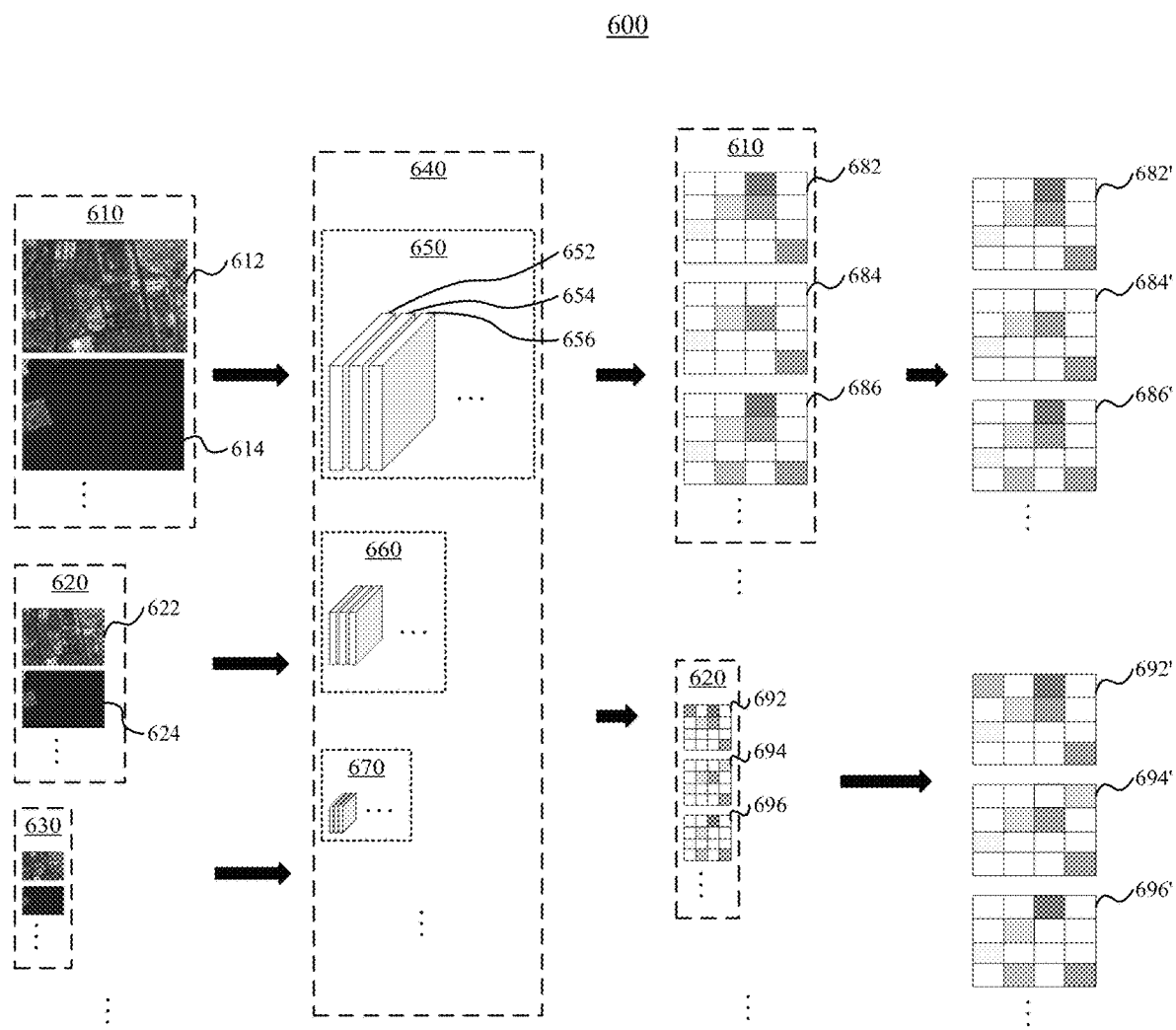
FIG. 6 shows a schematic diagram of an example operation of obtaining an object prediction map according to an embodiment of the present disclosure.

FIG. 6 shows a schematic diagram of an example operation 600 of obtaining an object prediction map according to an embodiment of the present disclosure. As shown in FIG. 6, one or more scaled original image blocks can have a first size 610, a second size 620, a third size 630 and the like. In the first size 610, scaled image blocks 612, 614 and the like are included. In the second size 620, scaled image blocks 622, 624 and the like are included. In the third size 630, scaled image blocks 632, 634 and the like are included. An object identification model 640 can include multiple sets of classification models, e.g., a classification model 650, a classification model 660, a classification model 670 and the like. Further, the classification model 650 can include a semantic segmentation network model 652, a semantic segmentation network model 654, a semantic segmentation network model 656 and the like.

In some embodiments, the scaled image block 612 in the first size 610 can be input into the semantic segmentation network model 652, the semantic segmentation network model 654, the semantic segmentation network model 656 and the like in the classification model 650 so as to obtain a plurality of prediction maps of the scaled image block 612 in the first size 610. The plurality of prediction maps in the first size 610 include a prediction map 682 generated by the semantic segmentation network model 652, a prediction map 684 generated by the semantic segmentation network model 654, a prediction map 686 generated by the semantic segmentation network model 656 and the like.

In some embodiments, the scaled image block 622 in the second size 620 can be input into the classification model 660 so as to obtain a plurality of prediction maps of the scaled image block 622 in the second size 620. The plurality of prediction maps in the second size 620 include prediction maps 692, 694, 696 and the like extracted by a plurality of semantic segmentation network models.

It should be noted that the scaled image block 612 in the first size 610 and the scaled image block 622 in the second size 620 correspond to the same original image block. Similarly, the scaled image block 614 in the first size 610 and the scaled image block 624 in the second size 620 also correspond to the same original image block.

In some embodiments, the plurality of prediction maps of the scaled image block 612 in the first size 610 and the plurality of prediction maps in the second size 620 can be scaled into a plurality of prediction maps 682', 684', 686', 692', 694' and 696' with a preset size, so that various pixel points of each scaled prediction map are in one-to-one correspondence with various pixel points of the same corresponding original image block.

Figure 7:
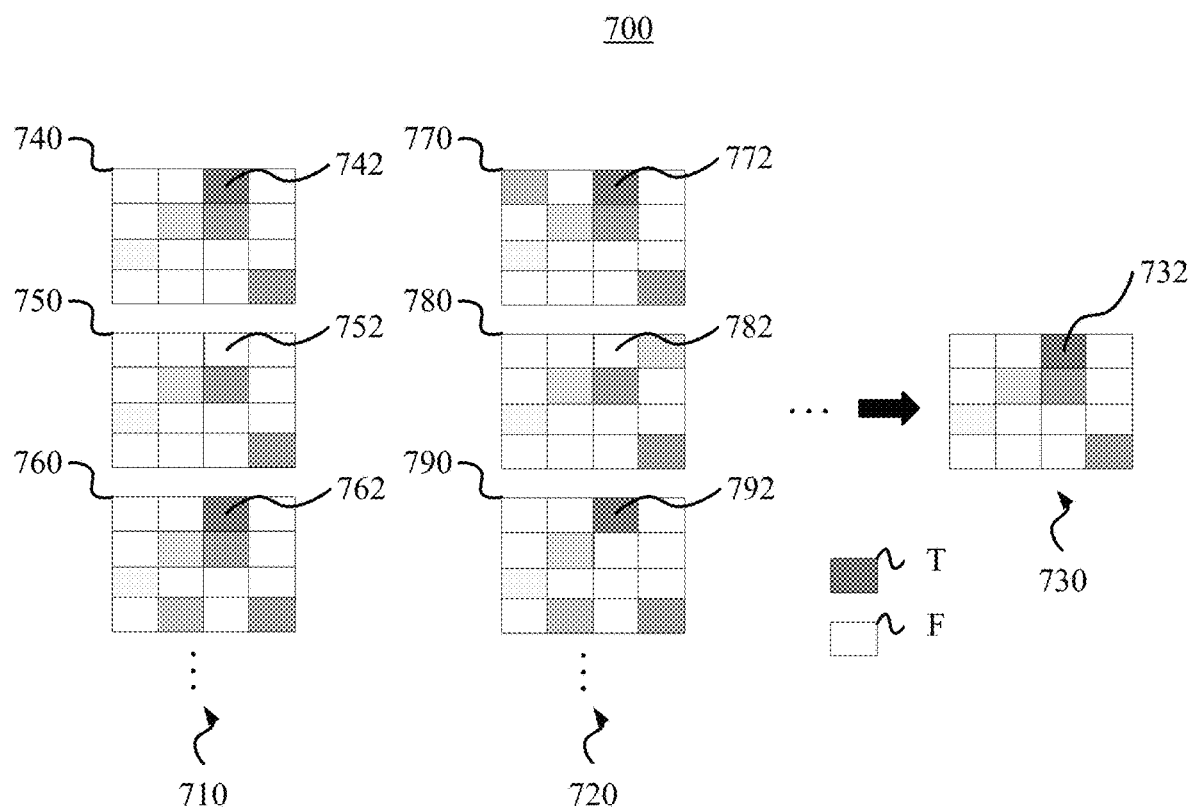
FIG. 7 shows a schematic diagram of an example operation of fusing prediction maps according to an embodiment of the present disclosure.

FIG. 7 shows a schematic diagram of an example operation 700 of fusing prediction maps according to an embodiment of the present disclosure. As shown in FIG. 7, the example operation 700 includes a plurality of prediction maps 740, 750, 760 and the like with the preset size after scaling in a first size 710, and a plurality of prediction maps 770, 780, 790 and the like with the preset size after scaling in a second size 720. All the prediction maps are fused to obtain an identification result 730 of the original image blocks.

In some embodiments, pixel points 742, 752 and 762 in the prediction maps 740, 750 and 760 with the preset size, which are obtained after being scaled in the first size 710, can respectively indicate prediction categories of corresponding pixel points in the scaled image block in the first size 710. For example, the pixel point 742 can indicate a prediction category of T, and the pixel point 752 can indicate a prediction category of F. Other pixel points 762, 772, 782 and 792 can respectively indicate the prediction categories of the same pixel point as T, T, F and T. All the prediction categories are counted, and the prediction category with a highest counting number is selected from the counting result to be a final category 732 of the pixel point. In some embodiments, there are four T categories and two F categories in the prediction categories of the pixel point, and the prediction category with the highest counting number is thus T. Therefore, the final category 732 of the pixel point is T.

In some embodiments, the T category can represent that the pixel point is positioned in a target region, and the F category can represent that the pixel point does not belong to the target region.

In conclusion, according to the embodiment of the present disclosure in which different types of segmentation network models are used for predicting various sizes of remote sensing images, different sizes of results predicted by various models are scaled into the prediction maps with the same size, and then each pixel point can be classified using a voting mechanism so as to obtain a final classification result. The method uses multi-size and multi-model prediction to generate a plurality of prediction results. By doing this, a few inaccurate prediction results can be removed, thus improving the accuracy of the target segmentation type.

Figure 8:
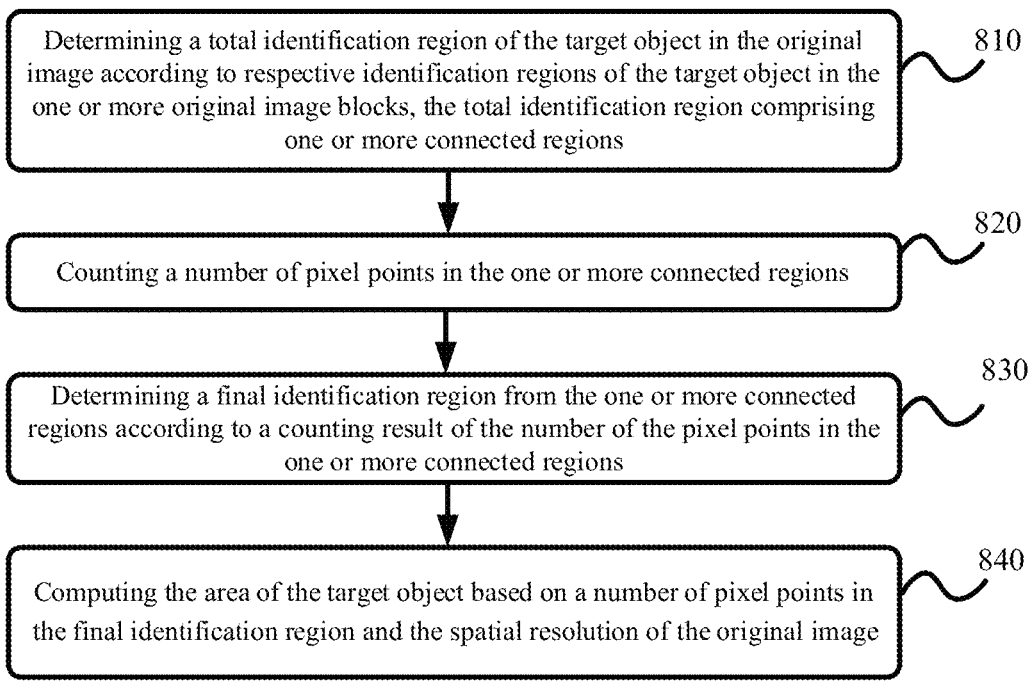
FIG. 8 shows a flow chart of an example operation of determining an area of a target object in the method in FIG. 2 according to an embodiment of the present disclosure.

FIG. 8 shows a flow chart of an example operation of determining an area of a target object in the method of FIG. 2 according to an embodiment of the present disclosure. As shown in FIG. 8, determining an area of the target object based on respective identification results of the one or more original image blocks and the spatial resolution of the original image (step 250) in FIG. 2 can include steps 810 to 840.

In step 810, a total identification region of the target object in the original image is determined according to respective identification regions of the target object in the one or more original image blocks. The total identification region includes one or more connected regions.

In step 820, the number of pixel points in the one or more connected regions is counted.

In step 830, a final identification region is determined from the one or more connected regions according to a counting result of the number of the pixel points in the one or more connected regions.

In step 840, the area of the target object is computed based on a number of pixel points in the final identification region and the spatial resolution of the original image.

In some embodiments, for a plurality of prediction classification results, regions with the same classification result can be used as identification regions of a target, and all the identification regions of the target in various original image blocks are spliced to obtain a final region of the target in the original image.

In some embodiments, the final region of the target can include one or more connected regions. By counting the number of the pixel points in each connected region and setting a minimum pixel point number threshold, it can be determined that the connected region does not belong to the final identification region in response to a determination that the number of the pixel points in any one of the one or more connected regions is smaller than the threshold.

In some embodiments, the connected regions in which the numbers of the pixel points are smaller than the threshold can be abandoned, and the rest of connected regions are used as the final target classification results.

In some embodiments, the number of the pixel points in a specified category can be counted, and is multiplied by the square of the resolution so as to obtain the final area of the target.

In conclusion, by setting the minimum threshold of the number of the pixel points in the target connected region, the small connected regions can be removed. The small connected regions in which the numbers of the pixel points are smaller than the threshold may result from image noise or other errors, and the classification accuracy and area computing precision can be improved by removing the connected regions with the excessively small classification results.

Figure 9:
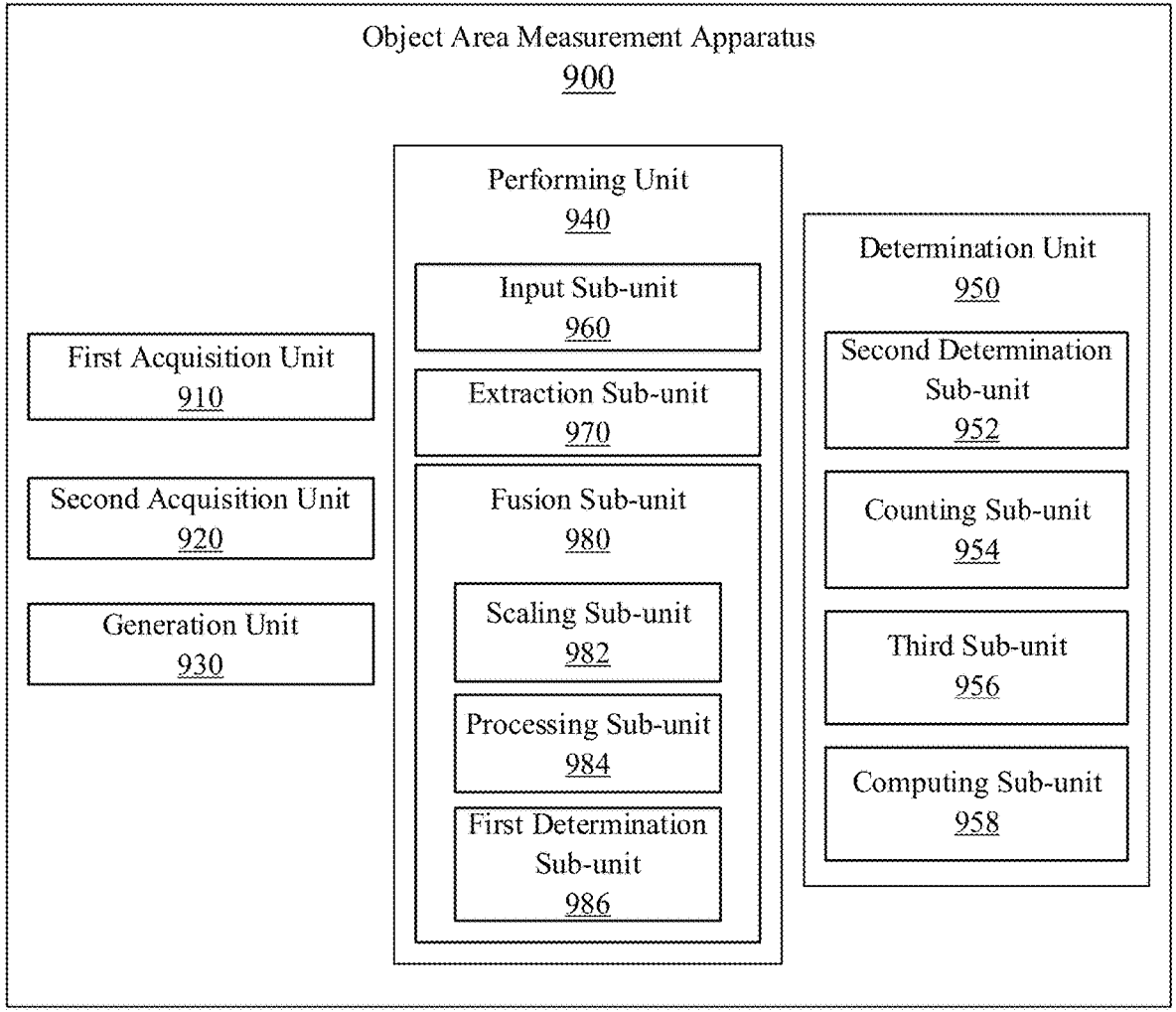
FIG. 9 shows a structural block diagram of an object area measurement device according to an embodiment of the present disclosure.

FIG. 9 shows a structural block diagram of an object area measurement apparatus 900 according to an embodiment of the present disclosure. As shown in FIG. 9, the apparatus 900 can include a first acquisition unit 910, a second acquisition unit 920, a generation unit 930, a performing unit 940 and a determination unit 950.

The first acquisition unit 910 can be configured to acquire an original image with a spatial resolution. The original image includes a target object.

The second acquisition unit 920 can be configured to acquire an object identification model. The object identification model includes at least two sets of classification models. Each of the at least two sets of classification models includes at least two types of semantic segmentation network models.

The generation unit 930 can be configured to generate one or more original image blocks based on the original image.

The performing unit 940 can be configured to carry out operations on each original image block, the operations including:

scaling each original image block at at least two scaling levels to obtain scaled image blocks with at least two sizes, wherein the scaled image blocks with the at least two sizes respectively correspond to the at least two sets of classification models; and inputting the scaled image blocks with the at least two sizes into the object identification model to obtain an identification result of the target object in the original image block.

The determination unit 950 can be configured to determine an area of the target object based on the respective identification results of the one or more original image blocks and the spatial resolution of the original image.

In some example embodiments, the generation unit 930 can be configured to cut the original image into one or more image blocks. Each image block has a preset size.

In some example embodiments, the performing unit 940 can further include an input sub-unit 960, an extraction sub-unit 970 and a fusion sub-unit 980.

The input sub-unit 960 can be configured to input the scaled image blocks with at least two sizes into corresponding sets of classification models in the at least two sets of classification models.

The extraction sub-unit 970 can be configured to extract prediction maps generated by the at least two types of semantic segmentation network models of each set of classification model for a scaled image block with a corresponding size in the scaled image blocks with the at least two sizes, wherein pixel points of each prediction map respectively indicate prediction categories of pixel points of the scaled image block with the corresponding size prediction.

The fusion sub-unit 980 can be configured to fuse the prediction maps respectively generated by the semantic segmentation network models of the at least two sets of classification models to obtain the identification result of the target object in the original image block.

In some example embodiments, the fusion sub-unit 980 can further include a scaling sub-unit 982, a processing sub-unit 984 and a first determination sub-unit 986.

The scaling sub-unit 982 can be configured to scale the prediction maps respectively generated by the semantic segmentation network models of the at least two sets of classification models to each have the preset size so that pixel points of each scaled prediction map are in one-to-one correspondence with pixel points of the original image block.

The processing sub-unit 984 can be configured to, for each pixel point of the original image block:
count respective prediction categories of the scaled prediction maps at a position of the pixel point, and
select a prediction category with a highest counting number from a counting result of the prediction categories as a final category of the pixel point.

The first determination sub-unit 986 can be configured to determine all pixel points, whose final categories are a target object category, in the original image block as identification regions of the target object in the original image block.

In some example embodiments, the determination unit 950 can further include a second determination sub-unit 952, a counting sub-unit 954, a third determination sub-unit 956 and a computing sub-unit 958.

The second determination sub-unit 952 can be configured to determine a total identification region of the target object in the original image according to the respective identification regions of the target object in one or more original image blocks, and the total identification region includes one or more connected regions.

The counting sub-unit 954 can be configured to count a number of pixel points in the one or more connected regions.

The third determination sub-unit 956 can be configured to determine a final identification region from the one or more connected regions according to a counting result of the number of the pixel points in the one or more connected regions.

The computing sub-unit 958 can be configured to compute the area of the target object based on a number of pixel points in the final identification region and the spatial resolution of the original image.

In some example embodiments, the third determination sub-unit can be configured to: in response to a determination that a number of pixel points in a connected region of the one or more connected regions is smaller than a threshold, determine that the connected region does not belong to the final identification region.

It should be understood that the units and sub-units of the apparatus 900 shown in FIG. 9 can correspond to the steps in the method 200 described with reference to FIG. 2 to FIG. 8. Therefore, the operations, characteristics and advantages described above for the method 200 are also applicable to the apparatus 900 and the units and the sub-units included in the apparatus 900, and will be not repeated here for conciseness.

Although specific functions are discussed above with reference to specific units, it should be noted that the functions of each unit discussed herein may be divided into a plurality of units, or/and at least some functions of the plurality of units may be combined into a single unit. An execution action of the specific unit discussed herein includes: the specific unit itself executes the action, or alternatively, the specific unit calls or accesses another component or unit which executes the action (or executes the action in combination with the specific unit) in other ways. Therefore, the specific unit executing the action may include the specific unit itself executing the action and/or another unit which is called by the specific unit or accessed in other ways to execute the action.

Various technologies may be described herein in the general context of software and hardware elements or program modules. Each unit and each sub-unit described above may be implemented in hardware or in hardware combined with software and/or firmware. For example, these units and sub-units may be implemented as a computer program code/instruction, the computer program code/instruction is configured to be executed in one or more processors and stored in a computer readable storage medium. Alternatively, these modules may be implemented as a hardware logic/circuit. For example, one or more of the units and the sub-units may be implemented together in a System On Chip (SOC). The SOC may include an integrated circuit chip (including a processor (for example, a Central Processing Unit (CPU), a microcontroller, a microprocessor, a Digital Signal Processor (DSP) and the like), a memory, one or more communication interfaces, and/or one or more parts in other circuits), and may optionally execute the received program code and/or include embedded firmware to perform functions.

According to another aspect of the present disclosure, provided is electronic equipment, including: a memory, a processor and a computer program stored on the memory, wherein the processor is configured to execute the computer program so as to implement the steps in the above-mentioned method according to the present disclosure.

According to yet another aspect of the present disclosure, provided is a non-transitory computer readable storage medium, storing a computer program, wherein when the computer program is executed by a processor, the steps in the above-mentioned method of the present disclosure are implemented.

According to still a further aspect of the present disclosure, provided is a computer program product, including a computer program, wherein when the computer program is executed by a processor, the steps in the above-mentioned method of the present disclosure are implemented.

Figure 10:
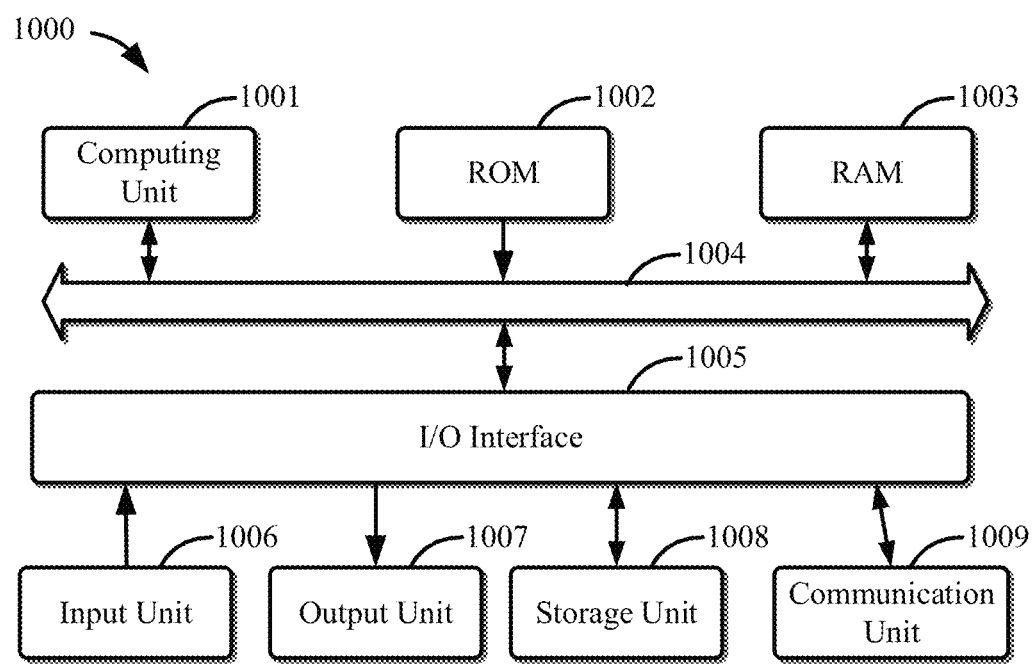
FIG. 10 shows a structural block diagram of example electronic equipment capable of being used for implementing embodiments of the present disclosure.

Hereinafter, examples of such electronic equipment, non-transitory computer readable storage medium and computer program product are described in combination with FIG. 10. FIG. 10 shows a structural block diagram of example electronic equipment capable of being used for implementing the embodiments of the present disclosure.

With reference to FIG. 10, a structural block diagram of electronic equipment 1000 which can be used as a server or a client of the present disclosure will be described, and the electronic equipment 1000 is an example capable of being applied to hardware equipment in each aspect of the present disclosure. The electronic equipment aims to represent various forms of digital electronic computer equipment, such as a laptop computer, a desktop computer, a workbench, a personal digital assistant, a server, a blade server, a large-scale computer and other proper computers. The electronic equipment further can represent various forms of mobile devices, such as a personal digital assistant, a cell phone, a smart phone, a wearable device and other similar computing devices. Parts, connections and relationships thereof as well as functions thereof shown herein are merely used as examples, and are not intended to limit implementations, described and/or required herein, of the present disclosure.

As shown in FIG. 10, the equipment 1000 includes a computing unit 1001, which can execute various proper actions and processing according to computer programs stored in a Read-Only Memory (ROM) 1002 or computer programs loaded into a Random Access Memory (RAM) 1003 from a storage unit 1008. In the RAM 1003, various programs and data required by operation of the equipment 1000 can also be stored. The computing unit 1001, the ROM 1002 and the RAM 1003 are connected with each other by a bus 1004. An Input/Output (I/O) interface 1005 is also connected to the bus 1004.

A plurality of parts in the equipment 1000 are connected to the I/O interface 1005, and include: an input unit 1006, an output unit 1007, the storage unit 1008 and a communication unit 1009. The input unit 1006 can be any type of equipment capable of inputting information to the equipment 1000, and the input unit 1006 can receive input digital or character information and generate a key signal input related to user settings and/or function control of the electronic equipment, and can include, but be not limited to, a mouse, a keyboard, a touch screen, a trackpad, a trackball, an operation rod, a microphone and/or a remote controller. The output unit 1007 can be any type of equipment capable of representing information, and can include, but be not limited to, a display, a loudspeaker, a video/audio output terminal, a vibrator and/or a printer. The storage unit 1008 can include, but be not limited to, a magnetic disk and an optical disk. The communication equipment 1009 allows the equipment 1000 to exchange information/data with other equipment through a computer network such as the Internet and/or various telecommunication networks, and can include, but be not limited to, a modulator-demodulator, a network card, infrared communication equipment, a wireless communication transceiver and/or a chipset, e.g., Bluetooth™ equipment, 1302.11 equipment, WiFi equipment, WiMax equipment, cellular communication equipment and/or a similar product.

The computing unit 1001 can be various universal and/or dedicated processing components with processing and computing capability. Some examples of the computing unit 1001 include, but are not limited to, a Central Processing Unit (CPU), a Graphic Processing Unit (GPU), various dedicated Artificial Intelligence (AI) computing chips, various computing units operating a machine learning model algorithm, a Digital Signal Processor (DSP), any proper processor, controller, microcontroller and the like. The computing unit 1001 executes the various methods and processing described above, e.g., the method 200. For example, in some embodiments, the method 200 can be implemented as a computer software program which is tangibly included in a machine readable medium, e.g., the storage unit 1008. In some embodiments, part or all of the computer programs can be loaded and/or installed on the equipment 1000 via the ROM 1002 and/or the communication unit 1009. When the computer programs are loaded to the RAM 1003 and executed by the computing unit 1001, one or more steps in the method 200 described above can be executed. Alternatively, in other embodiments, the computing unit 1001 can be configured to execute the method 200 in any other proper manners (e.g., by means of firmware).

Various implementation manners of the system and the technology described above herein can be implemented in a digital electronic circuit system, an integrated circuit system, a Field Programmable Gate Array (FPGA), an Application Specific Integrated Circuit (ASIC), an Application Specific Standard Product (ASSP), a System On Chip (SOC), a Complex Programmable Logic Device (CPLD), computer hardware, firmware, software and/or a combination thereof. Various these implementation manners can include implementation in one or more computer programs, the one or more computer programs can be executed and/or interpreted on a programmable system including at least one programmable processor, and the programmable processor can be a dedicated or universal programmable processor, and can receive data and an instruction from a storage system, at least one input device and at least one output device, and transmit the data and the instruction to the storage system, the at least one input device and the at least one output device.

Program codes for implementing the method of the present disclosure can be written by adopting any combination of one or more programming languages. These program codes can be provided to a processor or a controller of a universal computer, a dedicated computer or other programmable data processing devices, so that when the program codes are executed by the processor or the controller, functions/operations specified in the flow charts and/or the block diagrams are implemented. The program codes can be completely or partially executed on a machine, and as an independent software package, be partially executed on the machine and partially executed on a remote machine or completely executed on the remote machine or a server.

In the context of the present disclosure, the machine readable medium can be a tangible medium, and can include or store a program which is used by an instruction execution system, device or equipment or is combined with the instruction execution system, device or equipment for use. The machine readable medium can be a machine readable signal medium or a machine readable storage medium. The machine readable medium can include, but be not limited to, an electronic, magnetic, optical, electromagnetic, infrared or semiconductor system, device or equipment, or any proper combination thereof. A more particular example of the machine readable storage medium can include an electrical connection based on one or more wires, a portable computer disk, a hard disk, a Random Access Memory (RAM), a Read Only Memory (ROM), an Erasable Programmable Read Only Memory (EPROM or a flash memory), an optical fiber, a Portable Compact Disc-Read Only Memory (CD-ROM), optical storage equipment, magnetic storage equipment, or any proper combination thereof.

In order to provide interaction with a user, the system and the technology described herein can be implemented on a computer, the computer is provided with: a display device (e.g., a Cathode Ray Tube (CRT) or a Liquid Crystal Display (LCD) monitor) for displaying information to a user; and a keyboard and a pointing device (e.g., a mouse or a trackball), so that the user can provide an input to the computer by the keyboard and the pointing device. Other types of devices also can be used for providing interaction with the user; for example, feedback provided to the user may be any form of sensing feedback (e.g., visual feedback, auditory feedback, or tactile feedback; and the input from the user can be received in any form (including vocal input, voice input or tactile input).

The system and the technology described herein can be implemented in a computing system (e.g., a data server) including a background part, or a computing system (e.g., an application server) including a middleware part, or a computing system (e.g., a user computer with a graphical user interface or a network browser, the user can interact with the implementation manner of the system and the technology described herein through the graphical user interface or the network browser) including a front-end part, or a computing system including any combination of such background part, middleware part or front-end part. The parts of the system are connected with each other through any form or medium of digital data communication (e.g., communication network). Examples of the communication network include: a Local Area Network (LAN), a Wide Area Network (WAN) and the Internet.

The computer system can include a client and a server. The client and the server generally are away from each other and generally interact through the communication network. A relationship of the client and the server is produced by computer programs which are operated on a corresponding computer and mutually have a client-server relationship.

It should be understood that the steps can be resorted, added or deleted by using various forms of processes shown above. For example, the various steps recorded in the present disclosure can be executed in parallel, or can be sequentially executed or executed in different sequences, as long as the result expected by the technical solution disclosed by the present disclosure can be achieved, and no limitation is made herein.

Although the embodiments or examples of the present disclosure have been described with reference to the accompanying drawings, it should be understood that the above-mentioned method, system and equipment are merely example embodiments or examples, and the scope of the present disclosure is not limited by these embodiments or examples, but just limited by the authorized claims and the equivalent scope thereof. Various elements in the embodiments or the examples can be omitted or can be replaced with equivalent elements thereof. In addition, various steps can be executed in a sequence different from the sequence described in the present disclosure. Further, various elements in the embodiments or the examples can be combined in various manners. It is important that with technology evolution, many elements described herein can be replaced with equivalent elements which appear after the present disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An object area measurement method, applied to a computing device, the method comprising:
    acquiring an original image with a spatial resolution, the original image comprising a target object;
    acquiring an object identification model, the object identification model comprising at least two sets of classification models, and each of the at least two sets of classification models comprising at least two types of semantic segmentation network models;
    generating one or more original image blocks based on the original image;
    performing operations on each original image block, the operations comprising:
    scaling each original image block at at least two scaling levels to obtain scaled image blocks with at least two sizes, wherein the scaled image blocks with the at least two sizes are respectively associated with the at least two sets of classification models; and inputting the scaled image blocks with the at least two sizes into the object identification model to obtain an identification result of the target object in the original image block; and determining an area of the target object based on respective identification results of the one or more original image blocks and the spatial resolution of the original image.

2. The method according to claim 1, wherein the generating the one or more original image blocks based on the original image comprises cutting the original image into the one or more original image blocks, wherein each original image block has a preset size.

3. The method according to claim 2, wherein the inputting the scaled image blocks with at least two sizes into the object identification model comprises:

inputting the scaled image blocks with the at least two sizes into associated sets of classification models in the at least two sets of classification models;

extracting prediction maps generated by the at least two types of semantic segmentation network models of each set of classification model for a scaled image block with a corresponding size in the scaled image blocks with the at least two sizes, wherein pixel points of each prediction map respectively indicate prediction categories of pixel points of the scaled image block with the corresponding size; and fusing the prediction maps respectively generated by the semantic segmentation network models of the at least two sets of classification models to obtain the identification result of the target object in the original image block.

4. The method according to claim 3, wherein the fusing the prediction maps comprises:

scaling the prediction maps respectively generated by the semantic segmentation network models of the at least two sets of classification models to each have the preset size so that pixel points of each scaled prediction map are in one-to-one correspondence with pixel points of the original image block;

for each pixel point of the original image block:

counting respective prediction categories of the scaled prediction maps at a position of the pixel point; and selecting a prediction category with a highest counting number from a counting result of the prediction categories as a final category of the pixel point; and determining all pixel points, whose final categories are a target object category, in the original image block as identification regions of the target object in the original image block.

5. The method according to claim 4, wherein the determining the area of the target object comprises:

determining a total identification region of the target object in the original image according to respective identification regions of the target object in the one or more original image blocks, the total identification region comprising one or more connected regions;

counting a number of pixel points in the one or more connected regions;

determining a final identification region from the one or more connected regions according to a counting result of the number of the pixel points in the one or more connected regions; and computing the area of the target object based on a number of pixel points in the final identification region and the spatial resolution of the original image.

6. The method according to claim 5, wherein the determining the final identification region comprises: in response to a determination that a number of pixel points in a connected region of the one or more connected regions is smaller than a threshold, determining that the connected region does not belong to the final identification region.

7. The method according to claim 1, wherein each of the at least two types of semantic segmentation network models comprise one selected from a group consisting of an HR-NET model, a DEEPLABV3+ model and a U-NET model.

8. A computing device, comprising:

a memory, a processor and a computer program stored on the memory, wherein the processor is configured to execute the computer program to implement operations comprising:

acquiring an original image with a spatial resolution, the original image comprising a target object;

acquiring an object identification model, the object identification model comprising at least two sets of classification models, and each of the at least two sets of classification models comprising at least two types of semantic segmentation network models;

generating one or more original image blocks based on the original image;

performing operations on each original image block, the operations comprising:

scaling each original image block at at least two scaling levels to obtain scaled image blocks with at least two sizes, wherein the scaled image blocks with the at least two sizes are respectively associated with the at least two sets of classification models; and inputting the scaled image blocks with the at least two sizes into the object identification model to obtain an identification result of the target object in the original image block; and determining an area of the target object based on respective identification results of the one or more original image blocks and the spatial resolution of the original image.

9. The computing device according to claim 8, wherein the operation of generating one or more original image blocks based on the original image comprises cutting the original image into the one or more original image blocks, wherein each original image block has a preset size.

10. The computing device according to claim 9, wherein the operation of inputting the scaled image blocks with at least two sizes into the object identification model comprises:

inputting the scaled image blocks with the at least two sizes into associated sets of classification models in the at least two sets of classification models;

extracting prediction maps generated by the at least two types of semantic segmentation network models of each set of classification model for a scaled image block with a corresponding size in the scaled image blocks with the at least two sizes, wherein pixel points of each prediction map respectively indicate prediction categories of pixel points of the scaled image block with the corresponding size; and fusing the prediction maps respectively generated by the semantic segmentation network models of the at least two sets of classification models to obtain the identification result of the target object in the original image block.

11. The computing device according to claim 10, wherein the operation of fusing the prediction maps comprises:
  scaling the prediction maps respectively generated by the semantic segmentation network models of the at least two sets of classification models to each have the preset size so that pixel points of each scaled prediction map are in one-to-one correspondence with pixel points of the original image block;
  for each pixel point of the original image block:
  counting respective prediction categories of the scaled prediction maps at a position of the pixel point; and
  selecting a prediction category with a highest counting number from a counting result of the prediction categories as a final category of the pixel point; and
  determining all pixel points, whose final categories are a target object category, in the original image block as identification regions of the target object in the original image block.

12. The computing device according to claim 11, wherein the operation of determining the area of the target object comprises:
  determining a total identification region of the target object in the original image according to respective identification regions of the target object in the one or more original image blocks, the total identification region comprising one or more connected regions;
  counting a number of pixel points in the one or more connected regions;
  determining a final identification region from the one or more connected regions according to a counting result of the number of the pixel points in the one or more connected regions; and
  computing the area of the target object based on a number of pixel points in the final identification region and the spatial resolution of the original image.

13. The computing device according to claim 12, wherein the operation of determining the final identification region comprises: in response to a determination that a number of pixel points in a connected region of the one or more connected regions is smaller than a threshold, determining that the connected region does not belong to the final identification region.

14. The computing device according to claim 8, wherein each of the at least two types of semantic segmentation network models comprise one selected from a group consisting of an HR-NET model, a DEEPLAB3+ model and a U-NET model.

15. A non-transitory computer readable storage medium having a computer program stored thereon, wherein the computer program, when executed by a processor, implements operations comprising:
  acquiring an original image with a spatial resolution, the original image comprising a target object;
  acquiring an object identification model, the object identification model comprising at least two sets of classification models, and each of the at least two sets of classification models comprising at least two types of semantic segmentation network models;
  generating one or more original image blocks based on the original image;
  performing operations on each original image block, the operations comprising:
  scaling each original image block at at least two scaling levels to obtain scaled image blocks with at least two sizes, wherein the scaled image blocks with the at least two sizes are respectively associated with the at least two sets of classification models; and
  inputting the scaled image blocks with the at least two sizes into the object identification model to obtain an identification result of the target object in the original image block; and
  determining an area of the target object based on respective identification results of the one or more original image blocks and the spatial resolution of the original image.

16. The medium according to claim 15, wherein the operation of generating one or more original image blocks based on the original image comprises cutting the original image into the one or more original image blocks, wherein each original image block has a preset size.

17. The medium according to claim 16, wherein the operation of inputting the scaled image blocks with at least two sizes into the object identification model comprises:
  inputting the scaled image blocks with the at least two sizes into associated sets of classification models in the at least two sets of classification models;
  extracting prediction maps generated by the at least two types of semantic segmentation network models of each set of classification model for a scaled image block with a corresponding size in the scaled image blocks with the at least two sizes, wherein pixel points of each prediction map respectively indicate prediction categories of pixel points of the scaled image block with the corresponding size; and
  fusing the prediction maps respectively generated by the semantic segmentation network models of the at least two sets of classification models to obtain the identification result of the target object in the original image block.

18. The medium according to claim 17, wherein the operation of fusing the prediction maps comprises:
  scaling the prediction maps respectively generated by the semantic segmentation network models of the at least two sets of classification models to each have the preset size so that pixel points of each scaled prediction map are in one-to-one correspondence with pixel points of the original image block;
  for each pixel point of the original image block:
  counting respective prediction categories of the scaled prediction maps at a position of the pixel point; and
  selecting a prediction category with a highest counting number from a counting result of the prediction categories as a final category of the pixel point; and
  determining all pixel points, whose final categories are a target object category, in the original image block as identification regions of the target object in the original image block.

19. The medium according to claim 18, wherein the operation of determining the area of the target object comprises:
  determining a total identification region of the target object in the original image according to respective identification regions of the target object in the one or more original image blocks, the total identification region comprising one or more connected regions;
  counting a number of pixel points in the one or more connected regions;
  determining a final identification region from the one or more connected regions according to a counting result of the number of the pixel points in the one or more connected regions; and
  computing the area of the target object based on a number of pixel points in the final identification region and the spatial resolution of the original image.

20. The medium according to claim 19, wherein the operation of determining the final identification region comprises: in response to a determination that a number of pixel points in a connected region of the one or more connected regions is smaller than a threshold, determining that the connected region does not belong to the final identification region.

* * * * *

UNITED STATES PATENT AND TRADEMARK OFFICE
CERTIFICATE OF CORRECTION

PATENT NO. : 11,669,990 B2
APPLICATION NO. : 17/412574
DATED : June 6, 2023
INVENTOR(S) : Peng et al.

Page 1 of 1

It is certified that error appears in the above-identified patent and that said Letters Patent is hereby corrected as shown below:

In the Claims

Claim 14: Column 21, Line 46: "DEEPLAB3+ model" should read -- DEEPLABV3+ model --.

Signed and Sealed this
Eleventh Day of July, 2023

Katherine Kelly Vidal
*Director of the United States Patent and Trademark Office*